United States Patent
Brun et al.

(10) Patent No.: US 9,400,493 B2
(45) Date of Patent: Jul. 26, 2016

(54) SYSTEM AND METHOD FOR AUTOMATICALLY NAMING OBJECTS IN A BUILDING AUTOMATION SYSTEM

(75) Inventors: Gerhard Brun, Lucerne (CH); Herbert Meier, Baar (CH)

(73) Assignee: Siemens Schweiz AG, Zurich (CH)

( * ) Notice: Subject to any disclaimer, the term of this patent is extended or adjusted under 35 U.S.C. 154(b) by 510 days.

(21) Appl. No.: 13/432,417

(22) Filed: Mar. 28, 2012

(65) Prior Publication Data

US 2013/0085588 A1  Apr. 4, 2013

(30) Foreign Application Priority Data

Oct. 3, 2011  (EP) ...................................... 11183684

(51) Int. Cl.
| | | |
|---|---|---|
| G06F 19/00 | (2011.01) | |
| G05B 15/02 | (2006.01) | |
| G06F 9/44 | (2006.01) | |
| H04L 12/28 | (2006.01) | |

(52) U.S. Cl.
CPC *G05B 15/02* (2013.01); *G06F 8/24* (2013.01); *G05B 2219/23255* (2013.01); *G05B 2219/2642* (2013.01); *H04L 2012/285* (2013.01)

(58) Field of Classification Search
CPC ........... G05B 15/02; G05B 2219/2642; G05B 2219/23255; G06F 8/24; H04L 2012/285
USPC .................................. 700/5, 90, 95, 286–295
See application file for complete search history.

(56) References Cited

U.S. PATENT DOCUMENTS

| | | | | |
|---|---|---|---|---|
| 7,308,118 | B1* | 12/2007 | Meadows ....................... | 382/113 |
| 2005/0275525 | A1* | 12/2005 | Ahmed ............... | F24F 11/0086 |
| | | | | 340/524 |
| 2005/0289467 | A1* | 12/2005 | Imhof .................... | G05B 15/02 |
| | | | | 715/734 |
| 2009/0249446 | A1* | 10/2009 | Jenkins ................. | G06F 9/4443 |
| | | | | 726/3 |
| 2010/0069035 | A1* | 3/2010 | Johnson ..................... | 455/404.1 |

OTHER PUBLICATIONS

PCT Search Report and Written Opinion dated Jan. 3, 2013 for PCT Application No. PCT/EP2012/069264.
Extended Backkus—Naur Form, Wikipedia , Redirected from EBNF, http://en.wikipedia.org/wiki/EBNF, Feb. 6, 2012.

\* cited by examiner

*Primary Examiner* — Mohammad Ali
*Assistant Examiner* — Ziaul Karim

(57) ABSTRACT

A system, process, and method for modeling a building automation system is provided that permits a control program to easily and efficiently add building automation devices and automatically name them to improve efficiency and reduce errors.

21 Claims, 13 Drawing Sheets

SYSTEM AND METHOD FOR AUTOMATICALLY NAMING OBJECTS IN A BUILDING AUTOMATION SYSTEM

CROSS REFERENCE TO RELATED APPLICATIONS

This patent document claims priority under 35 U.S.C. §119 and all other benefits permitted by law from European Patent Application No. 11183684.7, entitled "Struktur and Verhalten eines Gebäudeautomationssystems," (Structure and Behavior of a Building Automation System) filed Oct. 3, 2011, the content of which is hereby incorporated by reference in its entirety to the extent permitted by law.

The subject matter of this application is additionally related to the subject matter in the following co-pending U.S. patent applications each by one or more of the same inventors as the present application and filed on the same day as the present application and commonly assigned herewith to Siemens AG:

Non-provisional, U.S. patent application Ser. No. 13/432,427, titled "Application-Generated Function Block For Data Exchange Between Control Programs And Building Automation Objects," filed on Mar. 28, 2012;

Provisional, U.S. patent application Ser. No. 61/617,008, titled "System, Method and Apparatus for Grouping Building Automation Objects for Group Communication Within a Building Automation System," filed on Mar. 28, 2012; and Provisional, U.S. patent application Ser. No. 61/617,020, titled "System, Method and Apparatus for Grouping Building Automation Objects for Group Communication With a Central Control Application Within a Building Automation System," filed on Mar. 28, 2012;

Each of these additional related applications is incorporated herein by reference in its entirety to the extent permitted by law.

TECHNICAL FIELD

The present invention generally relates to building systems and, more particularly, to systems, processes, and methods for efficiently communicating with a plurality of field devices in a hierarchal structure.

BACKGROUND

A building automation system is an arrangement for monitoring, open-loop control and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system process variables—such as room air conditioning variables or events for example—are detected, evaluated, monitored, influenced or generated, with the energy consumption of the building or campus also advantageously being optimized by the building automation system.

Generally, a building automation system encompasses and operates a plurality of what are known as field devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general a number of computers or processors for their activation and also as a rule a plurality of open-loop and closed-loop control devices as well as further devices, for example devices for linking the building automation system to external communication networks, screens of devices for analysis of video signals.

The elements (objects or field devices) of a building automation system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building automation system operation, there is a need to monitor the operation of, and often communicate with, the various dispersed elements of a building automation system.

Electrical or wireless communication media are used in a building automation system for the exchange of data of individual devices or parts of systems, as a rule a number of communication networks exist, with cables, optical data communication channels, ultrasound connections, electromagnetic near fields or radio networks able to be used, including fiber optic networks or cellular networks for example. Examples of technologies or standards able to be used for the said data exchange are BACnet, LON or LonWorks® from the company ECHELON, the European Installation bus EIB, KONNEX, ZigBee or PROFIBUS defined by German standard DIN 19245.

Building automation systems typically have one or more centralized control stations in which data from each of the elements in the system may be monitored and in which various aspects of system operation may be controlled and/or monitored. The control station typically includes a computer having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the APOGEE® INSIGHT® Workstation, available from Siemens Industry, Inc. of Buffalo Grove, Ill., which may be used with the model APOGEE® building automation system, also available from Siemens Industry, Inc. (APOGEE and INSIGHT are U.S federally registered trademarks of Siemens Industry, Inc.) In this system, several control stations, connected via an Ethernet or another type of network, may be distributed throughout one or more building locations, each having the ability to monitor and control system operation. As a consequence, different people in different locations of the facility may monitor and control building operations.

The typical building automation system (including those utilizing the APOGEE® Insight® Workstation) has a plurality of field panels and/or controllers that are in communication with a workstation. In addition, the building automation system also includes one or more field devices connected to the field panels and/or controllers. Each field device is typically operative to measure and/or monitor various building automation system parameters. In particular, each field device may include one or more sensors and/or actuators to measure and/or monitor corresponding "points" within the respective building and/or building automation system, As referenced herein, a "point" may be (i) any physical input or output to or from a respective controller, field device, sensor or actuator, or (ii) any virtual point associated with a control application or logic object within a controller or field panel that is measured, monitored or controlled. While the workstation is generally used to make modifications and/or changes to one or more of the various components of the building automation system, a field panel may also be operative to enable certain modifications and/or changes to one or more parameters of the system. This typically includes parameters such as a temperature set point or other set points in a field device controller or directly in a field device. In addition, the workstation may be configured to modify a control program or the like in a field panel for controlling a field device.

Adding components to the building automation system is inefficient and time consuming. Each of the individual field devices, components, and sub-components (collectively objects) needs to be entered and manually assigned a name in the building automation system so that the building automation system can communicate with the object. The naming of each of the objects is time consuming and error prone for at least these reasons. First, the name needs to be recallable such that the system can find the stored object. Second, names often times are duplicative of other names thus causing a system error by having two or more devices share the same name.

BRIEF SUMMARY

In a first aspect, a method for naming a plurality of building automation objects of a building automation model is provided. The method includes providing a building automation device; providing a building automation model including a parent view node object representing the building automation device and a child view node object logically linked to a field device, wherein the child view node object is logically linked to the parent view node object forming a hierarchical structure; assigning an object-name to the parent view node object representing a name of the building automation device; and assigning an object-name to the child view node object including the object-name of the parent view node object and a name representing the field device.

In a second aspect, a system for representing a hierarchal structure representing one or more building automation devices and one or more field devices is provided. The system includes a parent view node object representing a building automation device and logically linked to a plurality of child view node objects, wherein each of the plurality of child view node objects is logically linked to a field device; wherein the parent view node object includes an object-name, and wherein each of the plurality of child view node objects includes an object-name representing the field device to which each of the plurality of child view node objects is logically linked.

In a third aspect, a computer readable storage medium having stored therein data representing instructions executable by a programmed processor for iterating through a hierarchal structure representing one or more building automation devices and one or more field devices is provided. The storage medium includes instructions for accessing a parent view node object; accessing a child view node object; logically linking the child view node object to the parent view node object; assigning an object-name to the parent view node object; and assigning an object-name to the child view node object representing a field device logically linked to the child view node object.

BRIEF DESCRIPTION OF THE SEVERAL VIEWS OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims. Moreover, it is understood that the figures are not necessarily drawn to scale.

DETAILED DESCRIPTION OF PRESENTLY PREFERRED EMBODIMENTS

Figure 1:
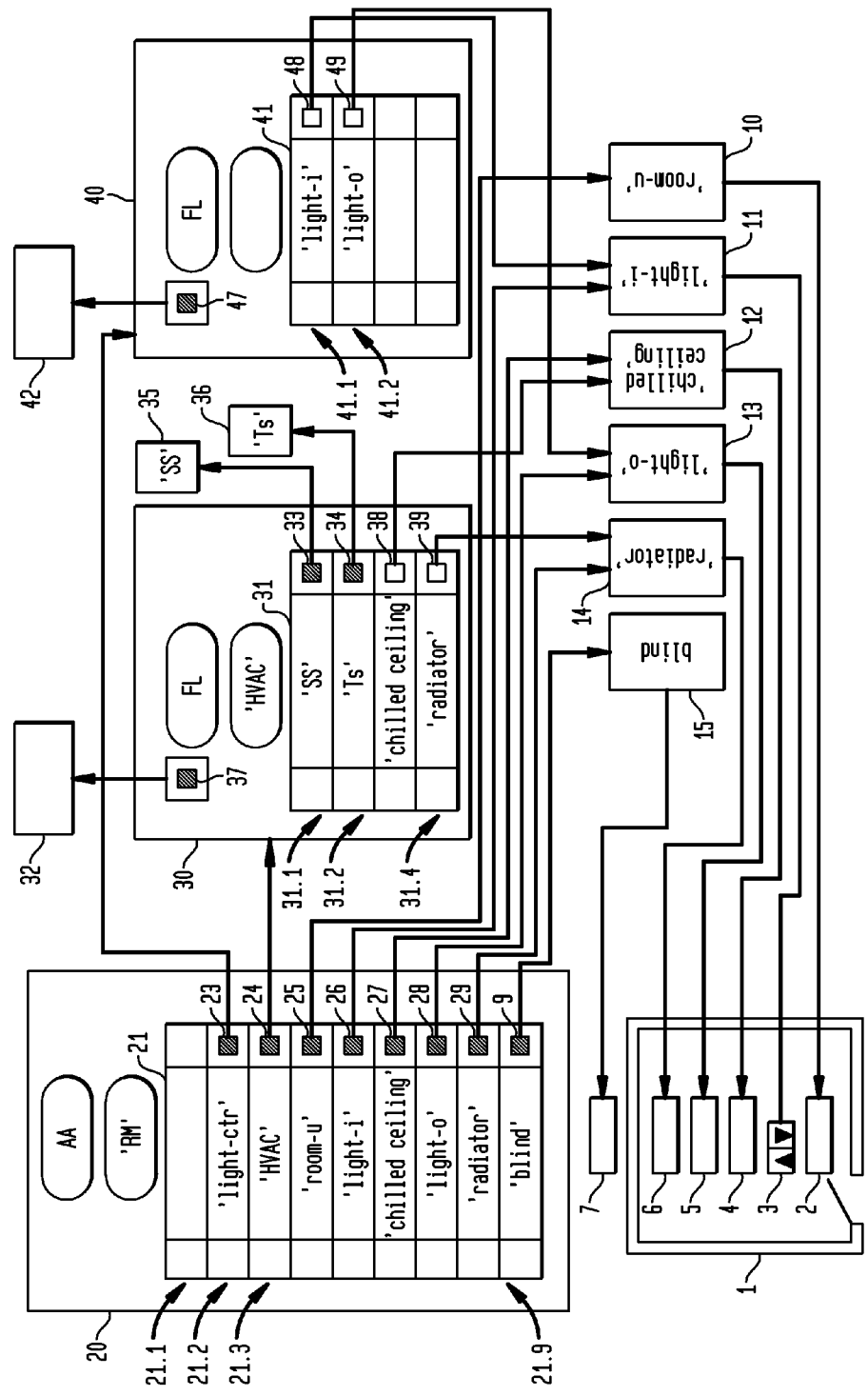
FIG. 1 illustrates a functional block diagram of a structure of a building automation system for operating a section of a building.

The exemplary embodiments provided are illustrative. The present invention is not limited to those embodiments described herein, but rather, the disclosure includes all equivalents. The systems, processes, and methods can be used in any field benefiting from dynamic configurable controllers.

Unless otherwise defined, all technical and scientific terms used herein have the same meaning as commonly understood by one of ordinary skill in the art. In case of conflict, the present document, including definitions, will control. Preferred methods and materials are described below, although apparatuses, methods, and materials similar or equivalent to those described herein can be used in practice or testing. All publications, patent applications, patents and other references cited herein are incorporated by reference in their entirety to the extent permitted by law. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

A more detailed description of the embodiments will now be given with reference to FIGS. 1-13. Throughout the disclosure, like reference numerals and letters refer to like elements. The present disclosure is not limited to the embodiments illustrated; to the contrary, the present disclosure specifically contemplates other embodiments not illustrated but intended to be included in the claims.

Because the naming of each object of a building automation system, including field devices and related components, is time consuming and error prone, what is needed a system and method to provide for automatically naming objects, such as those comprising a portion of a building automation system. Such a method and system reduces complexity and improves efficiency in adding an object to a building automation system. Additionally, such a method and system reduces human naming errors and duplication of already used names. Additional advantages and benefits will be apparent.

FIG. 1 illustrates a room 1 of a building section able to be operated by a building automation system by controlling and/or monitoring field devices therein. Assigned to the room 1 are a number of field devices, by the use of which for example a desired comfort for users and a required safety for users and infrastructure with optimized operating costs are able to be achieved. Typically assigned to the room 1 are a room unit 2, a light switch 3, an air conditioning register 4, a heating element 5, a heating register 6 and a blind drive 7, although other configurations are contemplated. The room unit 2 serves as the user interface to the building automation system, including but not limited to, to enter a nominal room temperature range and to display the current room temperature as well as to display an order of magnitude of the costs of the energy consumed by the room 1.

The devices operated in the room 1 are advantageously modeled in the software of the building automation system as far as is necessary and corresponding models are preferably implemented using an object-oriented approach. Typically the models are connected via input/output modules (or building automation objects, also referred to as BA objects) to field devices. For example the room unit 2 is mapped by a room unit model (or BA object) 10, the light switch 3 by a light switch model (or BA object) 11, the air conditioning register 4 by an air conditioning register model (or BA object) 12, the lighting element 5 by a lighting element model 13, the heating register 6 by a heating register model (or BA object) 14 and the blind drive 7 by a blind drive model (or BA object) 15 in the building automation system.

An overview of the totality of the functionality of the automation functions available for the room 1 is stored in a first overview node 20 (also referred to as parent view node object). The first overview node 20 is an object of the building automation system and features an overview list (also referred to as a view node item list) 21, which has at least one semantic information unit. The semantic information unit identifies an automation function, which is provided in the room 1 represented by the first overview node 20. Advantageously the semantic information unit contains at least one identifier suitable for identification and a relation to the automation function involved. The name is advantageously a string data type with a fixed or variable length. A collection of semantic information units (also referred to a view node item list) may include a logically linked list of semantic information units to one or more parent or child nodes.

A specific relationship between two nodes or objects of the building automation system is designated in this text by the term relation such that they form one or more parent-child relationships. The relation has a predefined type range which comprises at least two different relation types. In the present case what is known as a contacts (or connects) relation and what is known as "an owns" relation are defined or a logically linked/connected relationship. The contacts relation is identical here to the relation with the value "contacts" and means here that this relation is implemented such that the relation is suitable for a bidirectional data exchange between the nodes or objects concerned. The owns relation is identical here to the relation with the value "owns" and means here that this relation is implemented such that the relation is suitable one the one hand for a bidirectional data exchange between the nodes or objects concerned, on the other hand nodes or objects with the owns relation are advantageously existentially linked to one another such that they can only be copied, moved and deleted together, by an engineering tool for example.

In the present exemplary embodiment the overview list 21 has space for nine semantic information units 21.1 to 21.9 together forming a collection of semantic information units (also referred to as a view node item list).

A semantic information unit 21.3 able to be identified by the identifier "HVAC"—i.e. heating, ventilation and air conditioning—has an owns relation 24, which applies between the first overview node 20 (also referred to as a parent view node object) and a second overview node 30 (also referred to as a child view node object). The semantic information in the parent item list may be taken, at least in part, from a logically linked/connected child object (e.g. its part name). Moreover, similar sharing of information from a parent object logically connected to one or more child objects may share a number of other types of information, including but not limited to, semantic information. Accordingly, information may be shared, transferred, and reused among parent and child objects.

A semantic information unit 21.2 able to be identified by the identifier "light-ctr"—i.e. light control—has an owns relation 23, which applies between the first overview node 20 and a third overview node 40 (also referred to as a child view node object).

A semantic information unit 21.4 able to be identified by an identifier "room-u"—i.e. room unit—has an owns relation 25, which applies between the first overview node 20 and the room unit model 10.

A semantic information unit able to be identified by an identifier "light-i"—i.e. light input—has an owns relation 26, which applies between the first overview node 20 and the light switch model 11.

A semantic information unit able to be identified by an identifier "chilled ceiling" has an owns relation 27, which applies between the first overview node 20 and the air conditioning register model 12.

A semantic information unit able to be identified by an identifier "light-o"—i.e. light output—has an owns relation 28, which applies between the first overview node 20 and the illumination element model 13.

A semantic information unit able to be identified by an identifier "radiator" has an owns relation 29 which applies between the first overview node 20 and the air conditioning register model 14.

Finally a semantic information unit able to be identified by an identifier "blind" has its own relation 9, which applies between the first overview node 20 and the blind drive model 15.

An overview of an automation functionality designated "HVAC"—i.e. heating, ventilation and air conditioning, is stored in the second overview node 30. The second overview node 30 is an object of the building automation system and has an overview list 31 for storage of semantic information units 31.1 to 31.4 (also referred to as a view node item list).

A semantic information unit 31.1 able to be identified by an identifier "SS"—i.e. status—has an owns relation 33, which applies between the second overview node 30 and a first variable 35 advantageously implemented as an object, in which for example current information on the operating state of the automation functionality "HVAC" is able to be stored.

A semantic information unit 31.2 able to be identified by an identifier "Ts"—i.e. temperature setpoint value—has an owns relation 34, which applies between the second overview node 30 and a second variable 36 advantageously implemented as an object, in which for example the temperature setpoint value "Ts" applicable for the automation functionality "HVAC" is able to be stored.

A semantic information unit 31.3 able to be identified by an identifier "chilled ceiling" has a contacts relation 38, which applies between the second overview node 30 and the air conditioning register model 12.

A semantic information unit able to be identified by an identifier "radiator" has a contacts relation 39, which applies between the second overview node 30 and the heating register model 14.

The second overview node 30 has a further an owns relation 37, which applies between the second overview node 30 and an open-loop and/or closed-loop control program 32. The automation function required for heating, ventilation and air conditioning of the building section is programmed in the open-loop and/or closed-loop control program 32. The open-loop and/or closed-loop control program 32, the second overview node 30 and the further objects 35 and 36, linked by an owns relations to the overview node 30, form a functional unit through the said an owns relation 37. Through the action option of the available relations an access for reading and writing of data between the open-loop and/or closed-loop control program 32 on the one hand and objects connected via relations with the overview node 30 on the other hand is made possible indirectly via the overview node 30. The described structure of the functional unit makes it possible for field devices to be incorporated into and replaced in the building automation system without program code in the open-loop and/or closed-loop control program 32 concerned having to be adapted for this purpose.

An overview of an automation functionality designated by "light-ctrl"—i.e. light control—is stored in the third overview node 40. The third overview node 40 is an object of the building automation system and has an overview list 41 for storing semantic information units 41.1 to 41.4.

A semantic information unit 41.1 able to be identified by an identifier "light-i"—i.e. light input—has a contacts relation 38, which applies between the third overview node 40 and the light switch model 11.

A semantic information unit 41.2 able to be identified by an identifier "light-o"—i.e. light output—has a contacts relation 39, which applies between the third overview node 40 and the illumination element model 13.

The third overview node 40 has an owns relation 47, which applies between the third overview node 40 and an open-loop and/or closed-loop control program 42. The automation function required for light control in the assigned building section is programmed in the open-loop and/or closed-loop control program 42. The open-loop and/or closed-loop control program 42 and the third overview node 40 form one functional unit through the said owns relation 47. The opportunity of the available relations to have an effect makes possible access for reading and writing of data, between the open-loop and/or closed-loop control program 42 on the one hand and objects connected via relations with the third overview node 40 on the other hand, indirectly via the overview node 40. The described structure of the functional unit makes possible the inclusion and replacement of field devices into the building automation system, without program code in the open-loop and/or closed-loop control program 42 concerned having to be adapted for this purpose.

The semantic information units stored in the overview list 21, 31 or 41 are advantageously able to be identified via predefined or standardized designations. This enables operator views, for a control center or management system of the building automation system for example, to be generated in a user-friendly manner and with relatively little effort. By using predefined designations by means of the string data type for the semantic information units a currently-installed building automation system is able to be documented with relatively little effort.

In an embodiment variant of the overview node 20, 30 or 40, the overview list 21, 31 or 41 is ordered or sorted in accordance with certain rules.

Advantageously device models will be provided with a designation which is able to be evaluated on generation or checking of a relation. If for example, as shown in FIG. 1, the semantic information unit 21.9 of the overview list 21 1 assigned to the room 1 is identified by the character string "blind" and also the corresponding blind drive model 15 is marked with the same identifier, the generation or checking of the owns relation 9 will be simplified and able to be automated.

By using a marking with the data type character string or string in a device model, an automatic linkage of the device model to the associated function unit via the corresponding overview node is made possible without program code having to be modified in the assigned open-loop or closed loop control program.

In accordance with the structure of the building the building sections to be operated by the building automation system are typically divided into rooms with—under some circumstances—very different requirements, or by a grid with grid elements with similar or identical requirements. Overview nodes are advantageously used in advantageous modeling of rooms and grid elements. Grid elements are typically produced by an arrangement of support structures or window structures in the building section. Flexible modeling of the building is achieved by the use of two different types of overview node, a first type for a room and a second type for grid elements. Overview nodes of the type designed for a room are typically labeled "RM", i.e. room, in the drawing, overview nodes of the type designed for grid elements are labeled "GD", i.e. grid or grid element. The overview node 20 shown in FIG. 1 for room 1 is accordingly of type "RM". Overview nodes of type "GD" can be linked dynamically to an overview node of type "RM".

Figure 2:
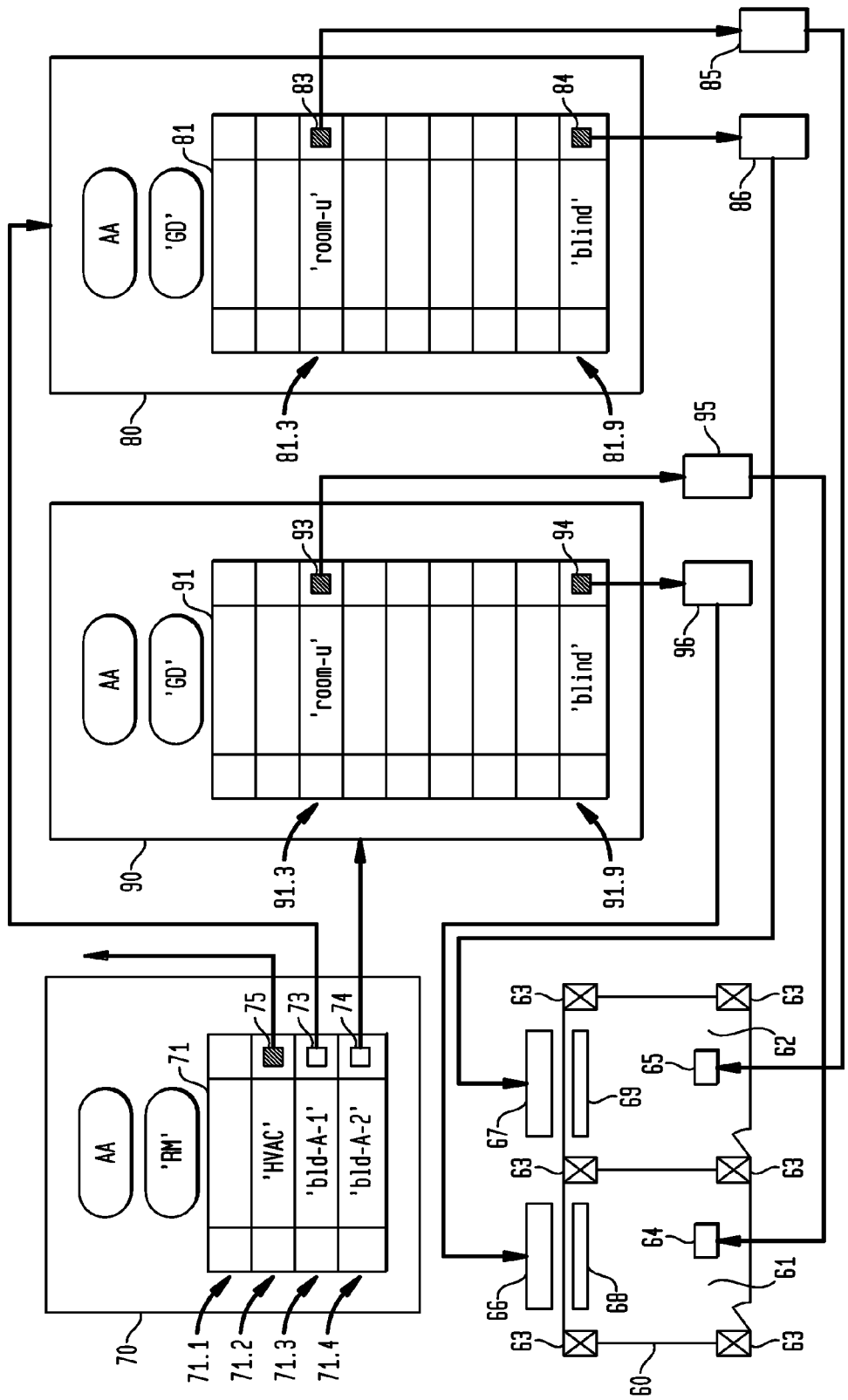
FIG. 2 illustrates a functional diagram for modeling a further building section, having a number of rooms or zones, able to be operated by the building automation system.

In FIG. 2 a building section divided into the grid is labeled 60, having a first grid element 62 and a second grid element 61. The grid structure of the building section 60 is provided here by support structures 63 for example. The devices assigned to the two grid elements 62 and 61 are reduced here to a minimum for the sake of simplification, since only the principle of the advantageous modeling is to be presented. Grid element 62 or 61 thus comprises a room unit 65 or 64, a heating register 69 or 68, and a blind drive 67 or 66.

The devices operating the grid element 62 or 61 are advantageously modeled in the software of the building automation system as far as necessary and corresponding models are advantageously implemented using an object-oriented approach. The models are typically connected via input/output modules to the field devices. For example the room unit 65 or 64 will be mapped by room unit model 85 or 95 respectively and the blind drive 67 or 66 by a blind drive model 86 or 96 respectively in the building automation system.

A fourth overview node (as referred to as a parent view node object) 70 of type "RM", i.e. room, describes the building section 60 which comprises the two grid elements 62 or 61 respectively. The fourth overview node 70 has an overview list 71 for storage of semantic information units 71.1, 71.2, 71.3 and 71.4 which may be logically linked to one or more child view node objects (such as child view node objects 80, 90). A semantic information unit 71.2 able to be identified by the identifier "HVAC"—i.e. heating, ventilation and air conditioning—has an owns relation 75, which is between the fourth overview node 70 and a functional unit is not shown in the diagram, through which for example the heating, ventilation and air conditioning functionality is guaranteed to the entire building section. Furthermore the overview list 71 comprises a semantic unit 71.3 able to be identified with the identifier "bld-A-1" and a semantic unit 71.4 able to be identified with the identifier "bld-A-2".

A current grid division of the building section 60 is stored by means of semantic information units of the overview list 71. The semantic information unit 71.3 has a contacts relation 73 which applies between the fourth overview node 70 describing the building section 60 and a fifth overview node 80. The semantic information unit 71.4 has a contacts relation 74 which applies between the fourth overview node 70 and a sixth overview node 90.

The fifth overview node 80 and the six overview node 90 of type "GD", i.e. grid or grid element. In accordance with the first overview node 20 in FIG. 1, which describes the totality of the automation functions specifically available for the room 1, the totality of the automation functions specifically available for the first grid element 62 is listed in the fifth overview node 80, and the totality of the automation functions specifically available for the second grid element 61 in the sixth overview node 90. Semantic information relating to the first grid element 62 is stored in the overview list 81 in the fifth overview node 89. Correspondingly semantic information relating to the second grid element 61 is stored in the overview list 91 in the sixth overview node 90.

The structure and the method of operation which are made possible by the overview nodes (also referred to as the view node objects), overview lists (also referred to as the view node item list), relations and functional units in particular produce at least the following advantages in the engineering, commissioning and maintenance phases: nodes are able to be copied during engineering, relations are able to be checked with the aid of suitable identifiers by an engineering tool or at runtime automatically; and field devices, grids and scope of the available functionality of building sections are able to be changed without modifications having to be made to the program code of open-loop and/or closed-loop control programs since the closed-loop and or open-loop control programs access field devices directly via overview nodes.

Figure 3:
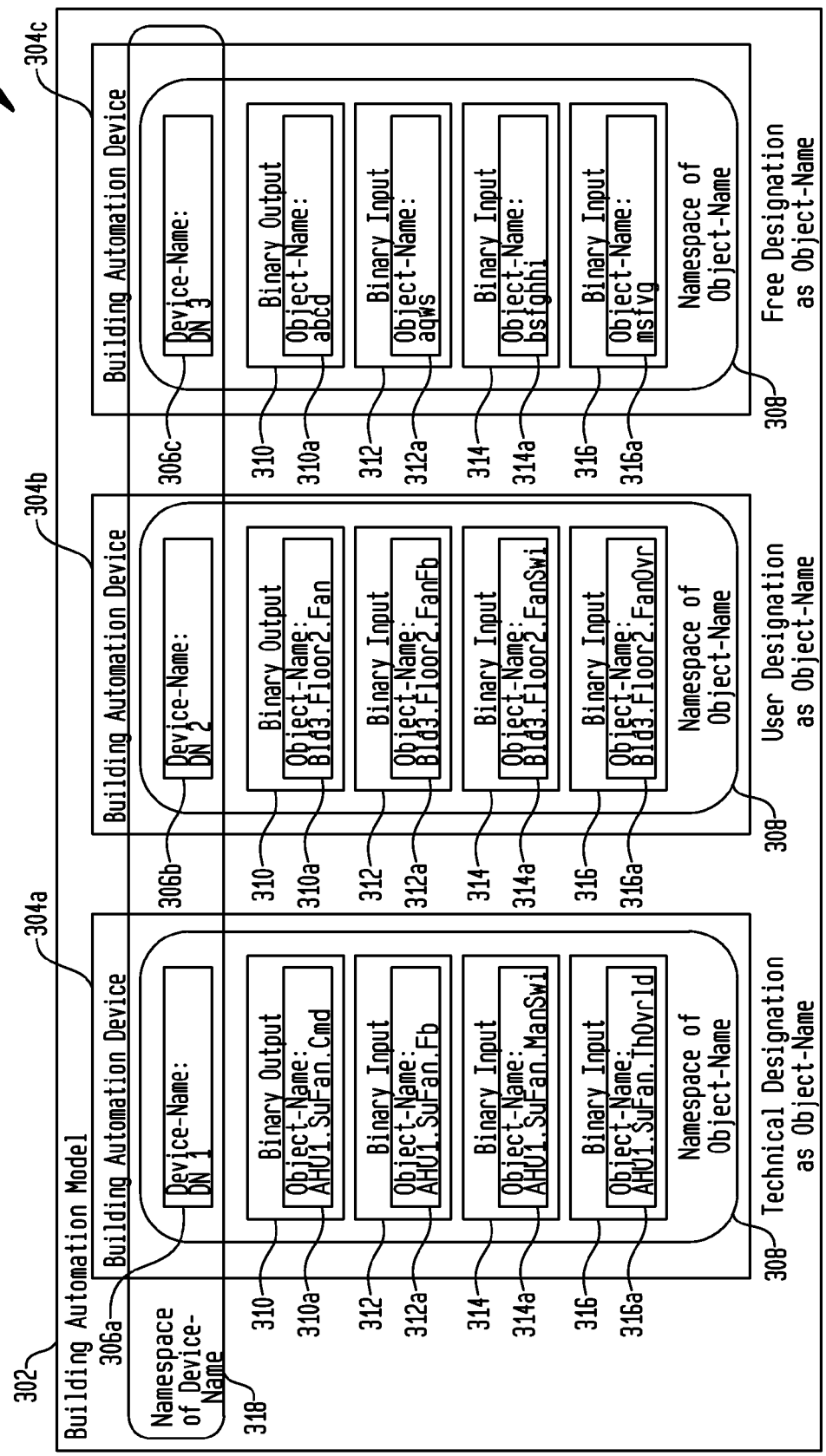
FIG. 3 illustrates a functional block diagram of a plurality of building automation devices together implementing a building automation model.

FIG. 3 illustrates a functional block diagram of a plurality of building automation devices 304a-304c together implementing building automation model 302 together forming system 300. Building automation devices 304a-304c include one or more view node objects 310-316 together comprising a collection of view node objects 308 within each building automation device 304a-304c. As is also illustrated in FIG. 3, some objects are illustrated as binary output objects (e.g. 310) and some are illustrated as binary input objects (e.g. 312-314) such that the object provides binary output or receives binary input, respectively from a respective field device or subcontroller of a respective field device (which is not illustrated in FIG. 3). Other types of inputs and outputs are contemplated, including but not limited to, analog inputs and outputs, multistate inputs and outputs, value objects, and any combination thereof from a respective field device or subcontroller of a respective field device.

Every view node object 310-316 includes at least one object-name 310a-316a which designates the view node objects 310-316 within the respective building automation device 304a-304c. Thus, namespace of object-name 310-316 spans a single automation device 304a-304c. Building automation model 302 does not impose any fixed, predefined syntactical or semantic naming schema on object-name 310a-316a. Nevertheless, a free or hierarchical naming convention may be applied to automatically configure object-names during engineering.

Every building automation device 304a-304c also features a device-name 306a-306c which uniquely designates building automation device 304a-304c within the complete building automation model 302. Thus, the namespace 308 of device-name 306a-306c spans the complete building automation model 302. No fixed, predefined syntactical or semantic naming schema is imposed on a device-name 306a-306c. Nevertheless, a free or hierarchical naming convention may be applied to automatically configure device-names 306a-306c during engineering.

For example, view node object 304 illustrates a technical naming designation wherein the object name follows some technical-predefined scheme. View node object 304b illustrates a user designation naming criteria, wherein the name scheme is decided by a user—often time on a whim. View node object 304c illustrates a free designation naming scheme wherein the name of object can be anything such that it does not adhere to any set criteria or scheme. As can be seen, object-names 310a-316a may be used to reference view node objects 310-316. However, the integrity of object-names 310a-310c of view node objects 310-316 as a reference may not be ensured because: (1) an object-name may be modified by engineering functions; (2) an object-name may be set-up as a standardized technical designation or as project-specific user designation; or (3) a user designation as an object-name may be set up in a late project phase or even by the end customer. Thus, by not having the system configured to automatically name objects, errors such as duplications, incorrect naming format, or other problems may occur.

Figure 4:
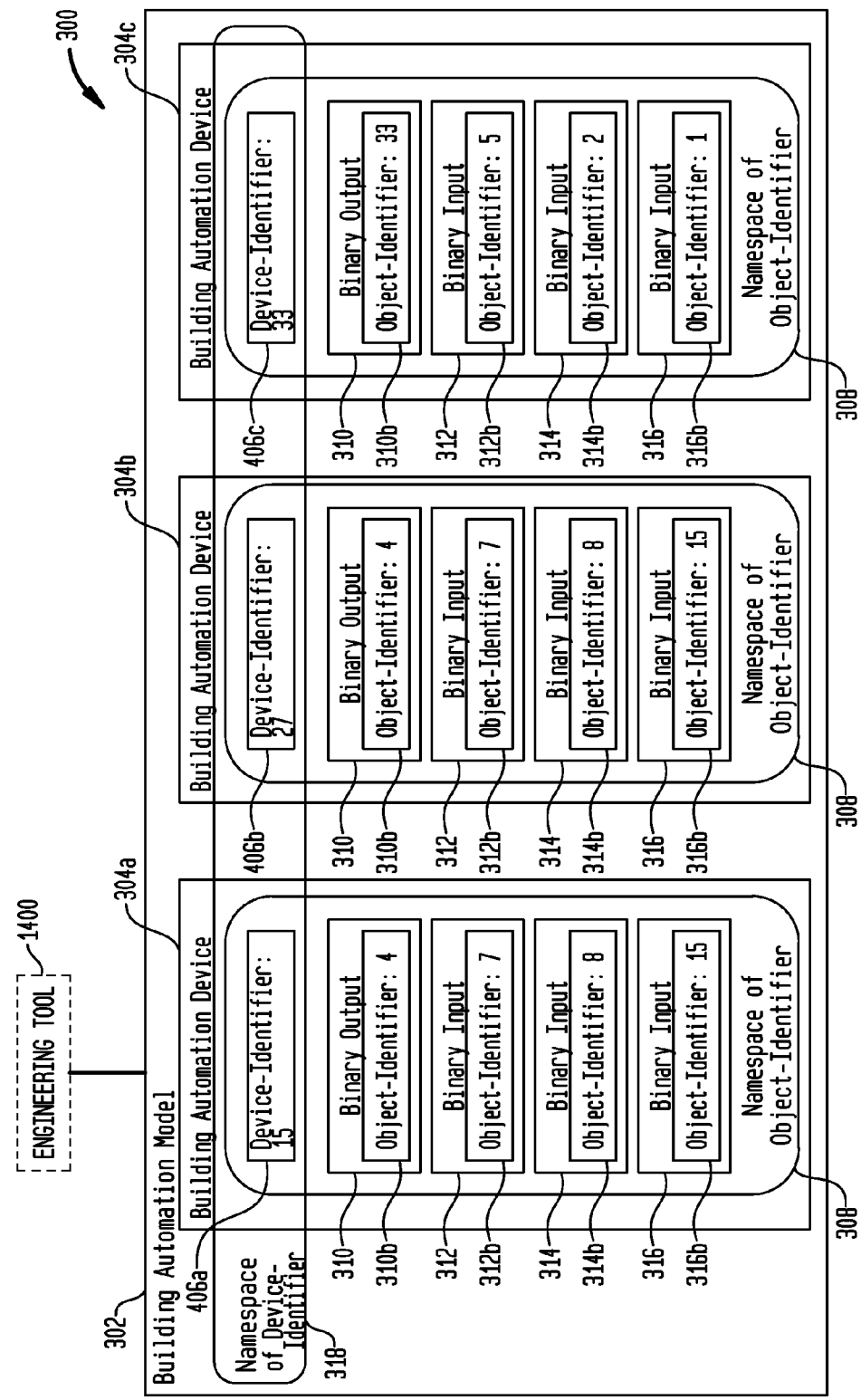
FIG. 4 further illustrates the functional block diagram of a plurality of building automation devices together implementing a building automation model illustrated in FIG. 3.

FIG. 4 further illustrates a functional block diagram of a plurality of building automation devices 304a-304c together implementing building automation model 302, together forming system 300 illustrated in FIG. 3.

Referring to FIG. 4, every view node object 310-316 features an object-identifier 310b-316b which uniquely identifies view node object 310-316 within building automation device 304a-304c. Every building automation device 304a-

304c also features a device-identifier 406a-406c which identifies uniquely building automation device 304a-304c within the building automation model 302.

Figure 5:
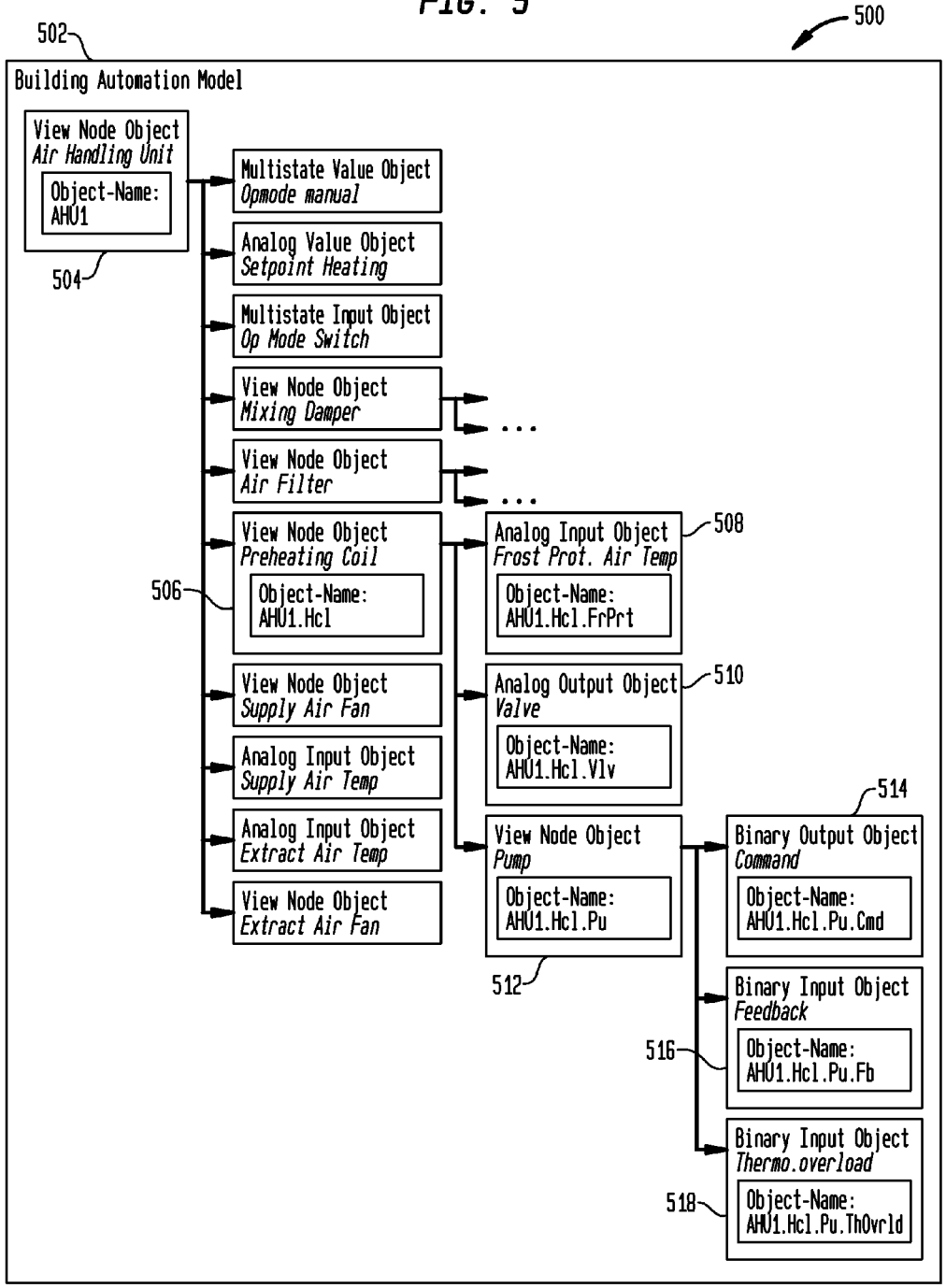
FIG. 5 illustrates a hierarchical naming structure of a building automation model.
Figure 6:
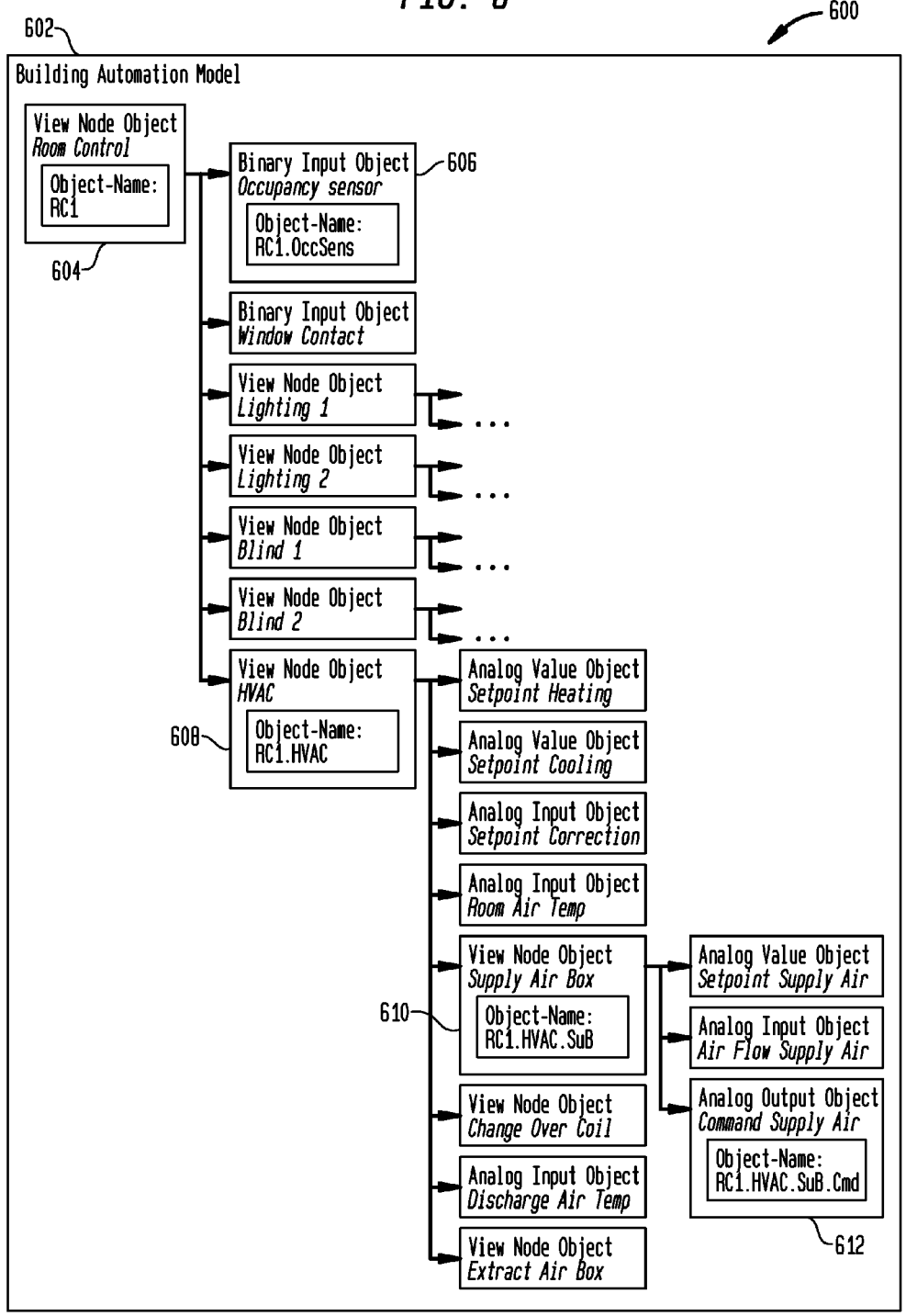
FIG. 6 illustrates another hierarchical naming structure of a building automation model.
Figure 7:
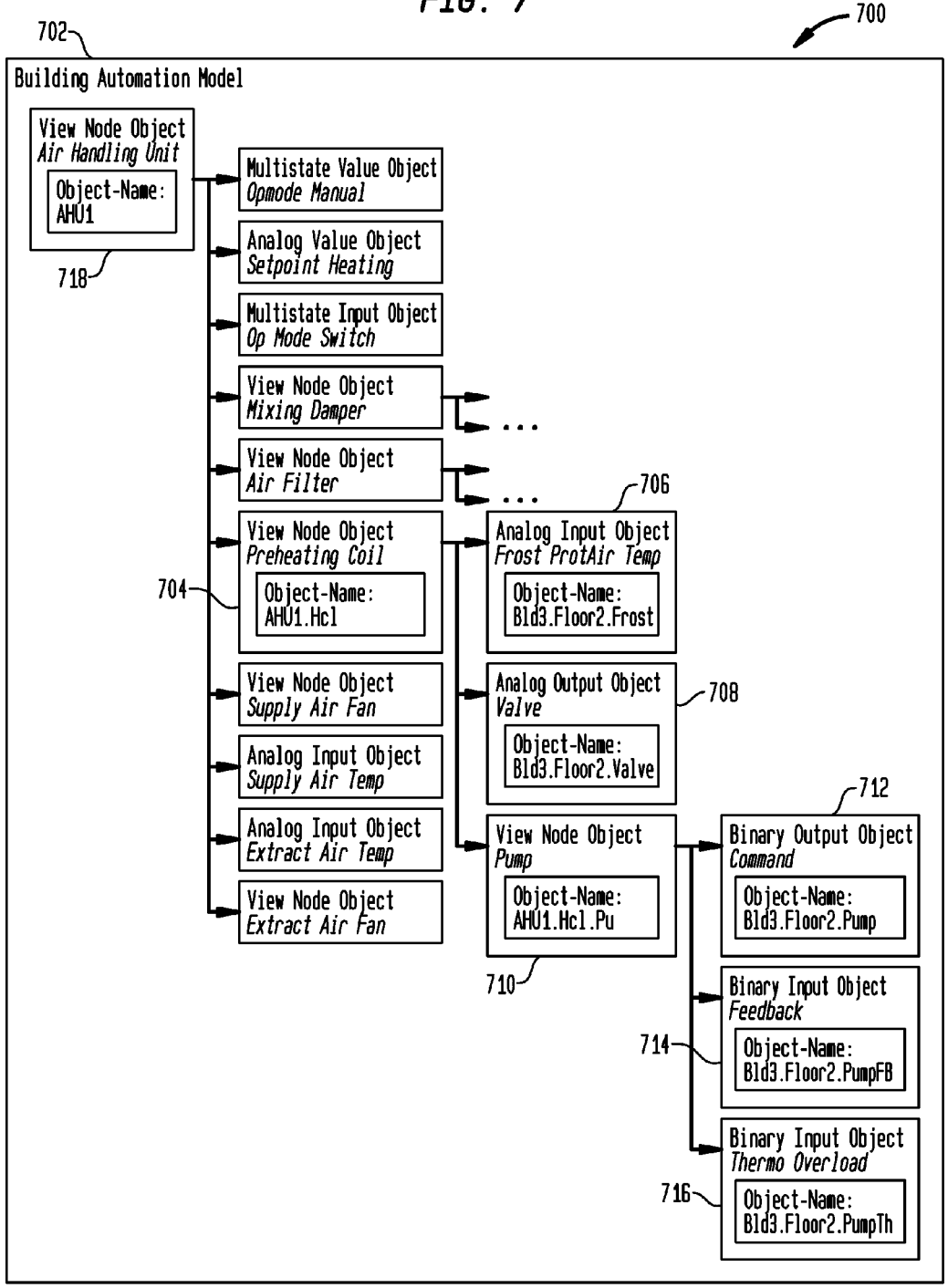
FIG. 7 illustrates another hierarchical naming structure of a building automation model.

Object-identifiers 310b-316b and device-identifiers 406a-406c may be used to reference a building automation device 304a-304c. The integrity of each of object-identifiers 310b-316b and device-identifiers 406a-406c reference will be ensured, because these identifiers may not be modified by engineering functions as illustrated in FIGS. 5-7 as may be employed in an engineering tool 1400 (illustrated in FIG. 4) for initially configuring or commissioning the building automation devices and object identifiers for the view node objects 310-316 to be employed in each building automation device. Accordingly, engineering functions will assign a standardized technical designation to object-name 310a-310c. To designate the view node object, the technical designation will be derived from the standardized engineering representation of the technical view. Depending on engineering conventions the applied namespace of the technical designations may either span one or more building automation devices (local namespace) or the complete building automation model (global namespace). Within the system, however, the assigned object-name will be considered as technical view independent from the user-specified view and the namespace as local.

For example, as described herein, a building automation device and/or the building automation model may include processing circuitry/logic configured to access and execute a control program that is stored in memory (such as random access memory, cache memory or other volatile memory storage device or computer readable media) or secondary storage (such as read only memory, non-volatile flash memory, hard drive, memory stick or other non-volatile memory storage device or computer readable media). The control program may be a separate program or a program module of the building automation device. The control program may include an operating system (such as Linux or other conventional operating system). The control program instructs and interacts with a hierarchy of objects representing building automation objects throughout building automation model represented as a plurality of view node objects configured in a hierarchal structure, such as one or more view node object parents and one or more view node object children, to assign a name to the object. Accordingly, the control program may iterate through the one or more parent view node objects and the one or more child view node objects logically linked to the one or more parent view node objects and read and/or write data within any object so as to communicate with one or more field devices (including but not limited to sensors and actuators) logically linked to the one or more child view node objects.

FIG. 5 illustrates a hierarchical naming structure 500 of a building automation model 502 including a field device corresponding to an air handling unit represented by view node object 504. Building automation model 502 includes a plurality of view node objects 504-518, similar to those illustrated in FIGS. 3-4. The hierarchal system forms a logical tree of parent-child nodes such that each child is logically linked to its parent forming a logically linked list. Accordingly, by iterating from the parent node, each of the children, grandchildren, and so forth are able to be discovered.

As illustrated in FIG. 5, view node objects 504-518 are ordered in a hierarchy such that view node object 504 is a parent of view node object 506, which is a parent of view node objects 508-512, wherein view node object 512 is the parent of view node objects 514-518. Accordingly, view node objects 514-518 are children of view node object 512, which is a child of view node object 506, which is a child of view node object 504. In the example illustrated in FIG. 5, object 514 is a binary output object of the pump field device identified by the view node object 512 having the object-name of AHU1Hcl.Pu such that it provides output data in binary format, and objects 516-518 are binary input objects such that they accept binary data. Other types of inputs and outputs are contemplated, including but not limited to, analog inputs and outputs, multistate inputs and outputs, value objects, and any combination thereof from a respective field device or subcontroller of a respective field device. The one or more last children in the hierarchal chain is logically linked to a field device such that data correlating to the field device, including data to operate the field device, may be read or written thereto.

As can be seen, the object name of each child view node object, has appended thereto, the object name appended of its parent, together comprising a string representing the name of the field device to which it is logically linked. For example, view node object 506 has an object-name of AHU1.Hcl, wherein AHU1 is the name of the parent view node object 504 of child view node object 506. AHU1 designates field device air handling unit 1; Hcl designates preheating coil. View node object 514 has an object-name comprised of its name, the object-name of its parent view node object 512 (which comprises the object-name of its parent 506 and the object-name of its parent 504). The individual portion of a name representing a specific object may follow a naming scheme, including but not limited to: AHU1 designating air handling unit 1; Hcl designating preheating coil; Pu designating pump; Cmd designating command; FrPrt designating frost protection air temperature; Vlv designating valve; Fb designating feedback; ThOvrld designating thermal overload; SuB designating supply air box; R1 designating room control 1; MntSwi designating maintenance switch; RC designating room control; OccSens designating occupancy sensor; HVAC designating an HVAC device; other names of objects are contemplated and are not limited to the exemplary names illustrated herein. Accordingly, the object-name of view node object 514 is AHU1.Hcl.Pu.Cmd wherein AHU1 designates air handling unit 1 (e.g. view node object 504); Hcl designates preheating coil (e.g. view node object 506); Pu designates pump (e.g. view node object 512), and Cmd designates command (e.g. view node object 514). Similar naming formats are contemplated. For example, AHU1.Hcl.Pu.MntSwi may designate: air handling unit 1/preheating coil/pump/maintenance switch. R1.HVAC.SuB.Cmd may designate: room control 1/HVAC/supply air box/command supply air. Moreover, although an air handling unit is illustrated herein, other devices are contemplated throughout the embodiments, including but not limited to other objects and functionalities, including but not limited to, lighting, shading, HVAC functions, and combinations thereof.

FIG. 6 illustrates another hierarchical naming structure 600 of building automation model 602 having a room control with a variable air volume ("VAV")-system logically linked to one or more field devices. View node object 604, representing a room control device, is the parent object of view node object 606, representing an occupancy sensor, and view node object 608, representing an HVAC device, is the parent of view node object 610, representing a supply air box device, which is the parent of view node object 612, representing field device command supply air object. As illustrated in FIG. 6, child view node object 612 has an object name comprised of its parent hierarchal tree structure.

FIG. 7 illustrates another hierarchical naming structure 700 of building automation model 702 wherein view node object 718 represents an air handing unit building automation device. A project may require dedicated structured user designations specified by the customer. Typically, such user designations include structured geographical and/or functional information to identify and name view node objects. For example, in some locations, such as European countries, customers may apply a naming schema based on the standards DIN 6779-12 in connection with DIN 6779-1, DIN EN 61346-1 and DIN EN 61346-2, which standardize functional, product-oriented, and geographical designators for technical objects, and documentation in the area of construction and technical building infrastructure.

If user designations are applied to name view node objects, engineering functions will set-up a hierarchical structured name schema and derive the user designations to name those view node objects which require a project-specific user designation. Depending on engineering conventions the applied namespace of the user designations may either span one building automation device (local namespace) or the complete building automation model (global namespace). However, the view node objects representing the standardized technical view may keep their technical designations. Furthermore, user designations may be set up in a late project phase or even by the end customer. Within such a system, however, the assigned object-name will be considered as technical view independent from the user-specified view and the namespace as local.

For example, as illustrated in FIG. 7, building automation model 702 includes a plurality of view node objects 704-718 arranged in a hierarchal tree structure. Object 712 is named Bld3.Floor2.Pump which designates: building 3/floor 2/pump. Other naming schemes are contemplated, such as the name ++46.U1.L16.02-TL001.G01;E01 which may designate: building 46/floor U1/geographical raster L16/room 2/air conditioning plant 001/supply fan 1/binary command 1/according to DIN 6779-12, DIN 6779-1, DIN EN 61346-1 and DIN EN 61346-2. A similar structure may be formed for other devices, such as the VAV and room control being the parent object.

Figure 8:
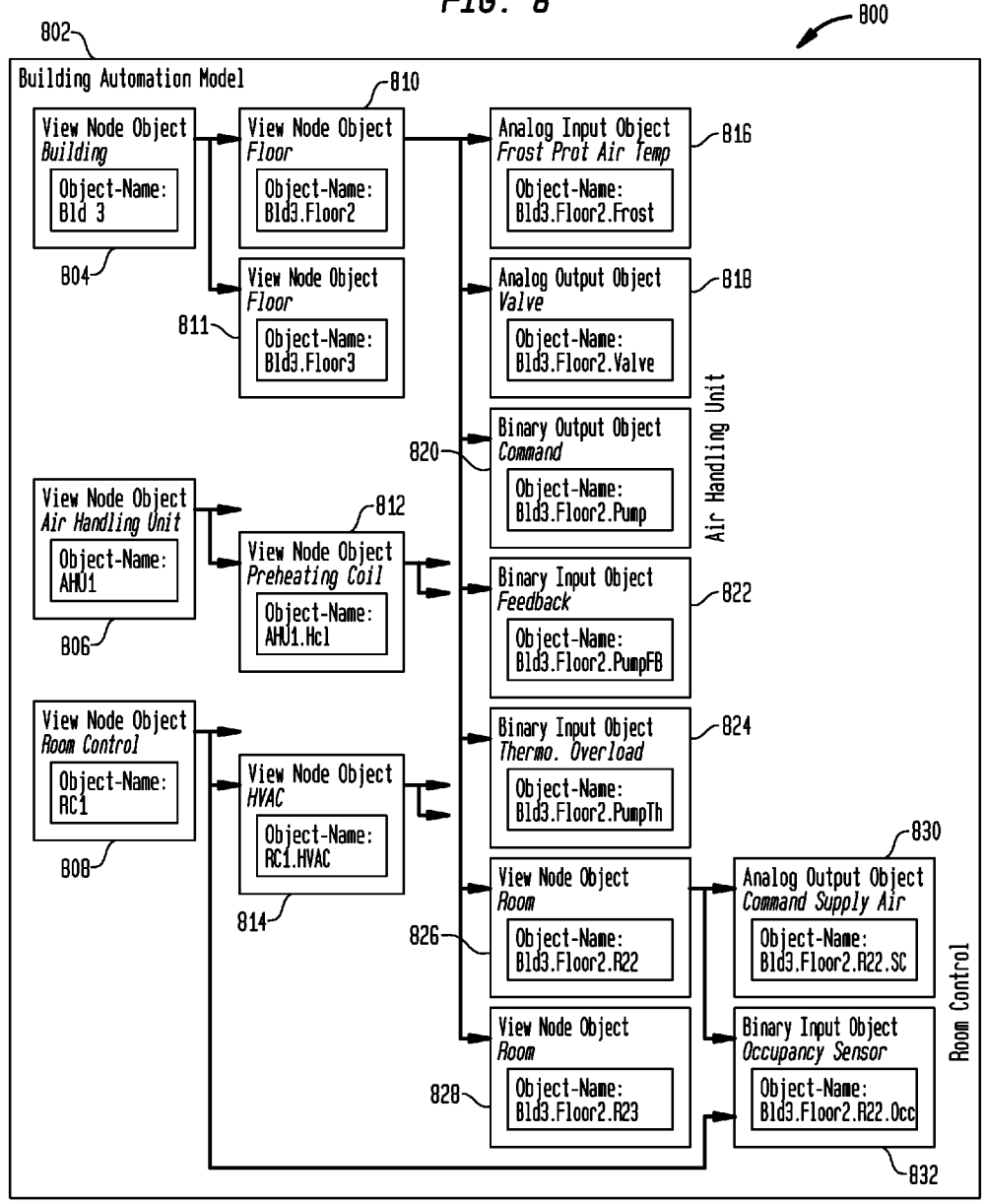
FIG. 8 illustrates another hierarchical naming structure of a building automation model.

FIG. 8 illustrates another hierarchical naming structure 800 of building automation model 802 wherein view node object 804 represents a building, view node object 806 represents an air handling unit, and view node object 808 represents a room control. View node objects 810, 811, representing floor objects, are children of view node object 804. View node object 812, representing a preheating coil, is a child of view node object 806. View node object 814 representing an HVAC device is a child of view node object 808. Each of objects 810-814 are logically linked to objects 816-828 and their children objects 830-832. As illustrated in FIG. 8, the hierarchical defined naming schema of user designations may be mapped during engineering to view node objects to provide a customer-tailored user view as an addition to the standardized technical view. Such a project-specific user view may be independent of the technical view and would enable the user to navigate according to the user designations. Accordingly, as illustrated in FIG. 8, the user would view a custom-tailored view of an air handling unit with room control with a VAV system. Other configurations are contemplated.

Figure 9:
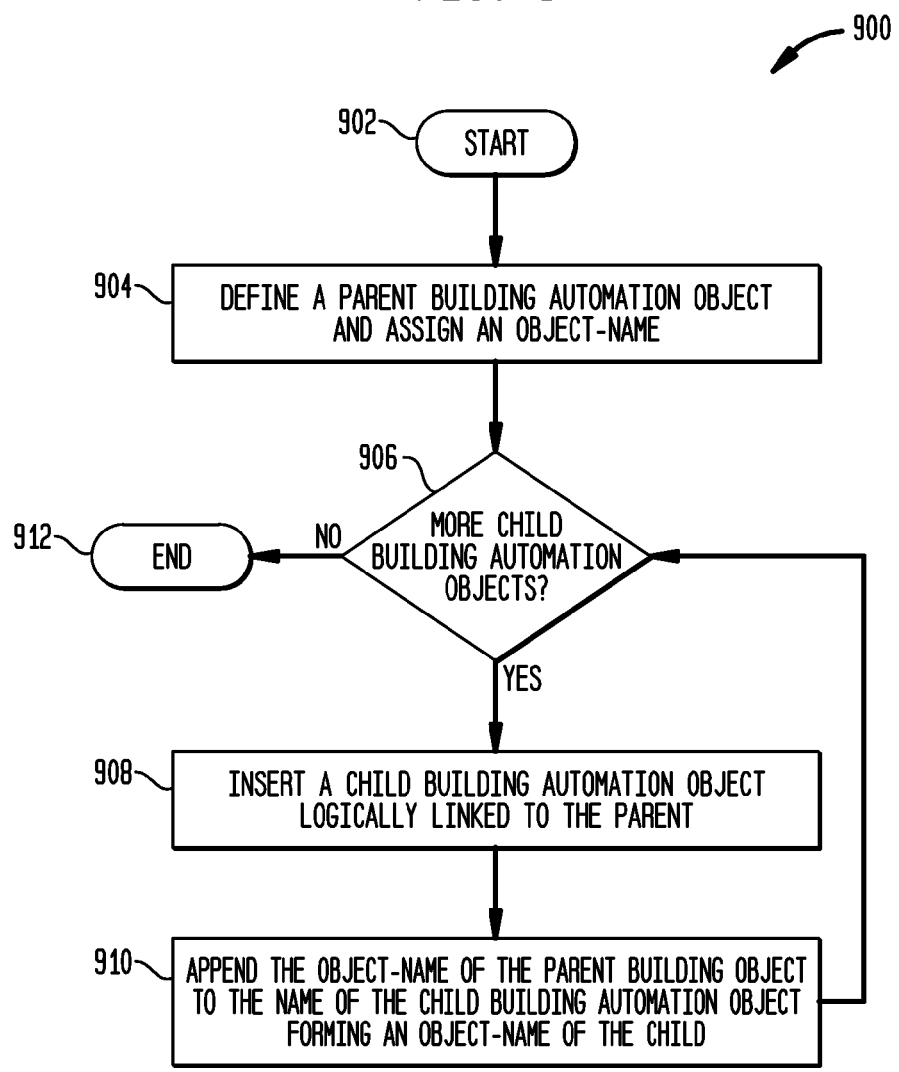
FIG. 9 illustrates a method of inserting and naming building automation objects to form a building automation model.

FIG. 9 illustrates a method of inserting and naming building automation objects to form a building automation model 900 as may be implemented by an engineering tool that may be used to configure and commission a building automation model for implementation in building automation devices as illustrated. At block 902 the method starts. At block 904, a parent building automation object is defined, such as a parent view node object and is assigned an object-name, such as one representing a building automation device. At block 906 it is determined if child building automation objects need to be input into the building automation model. If yes, the process continues to block 908; if no, the process continues to block 912. If yes, the process continues to block 908 wherein a child building automation object is inserted into the building model and logically linked to the parent. At block 910 the object-name of the parent building object is appended to the name of the child building automation object representing a field device to which it is logically linked, forming an object-name of the child. The process then returns to block 906 to determine if additional children exist. If no, the process continues to block 912 where it ends.

Figure 10:
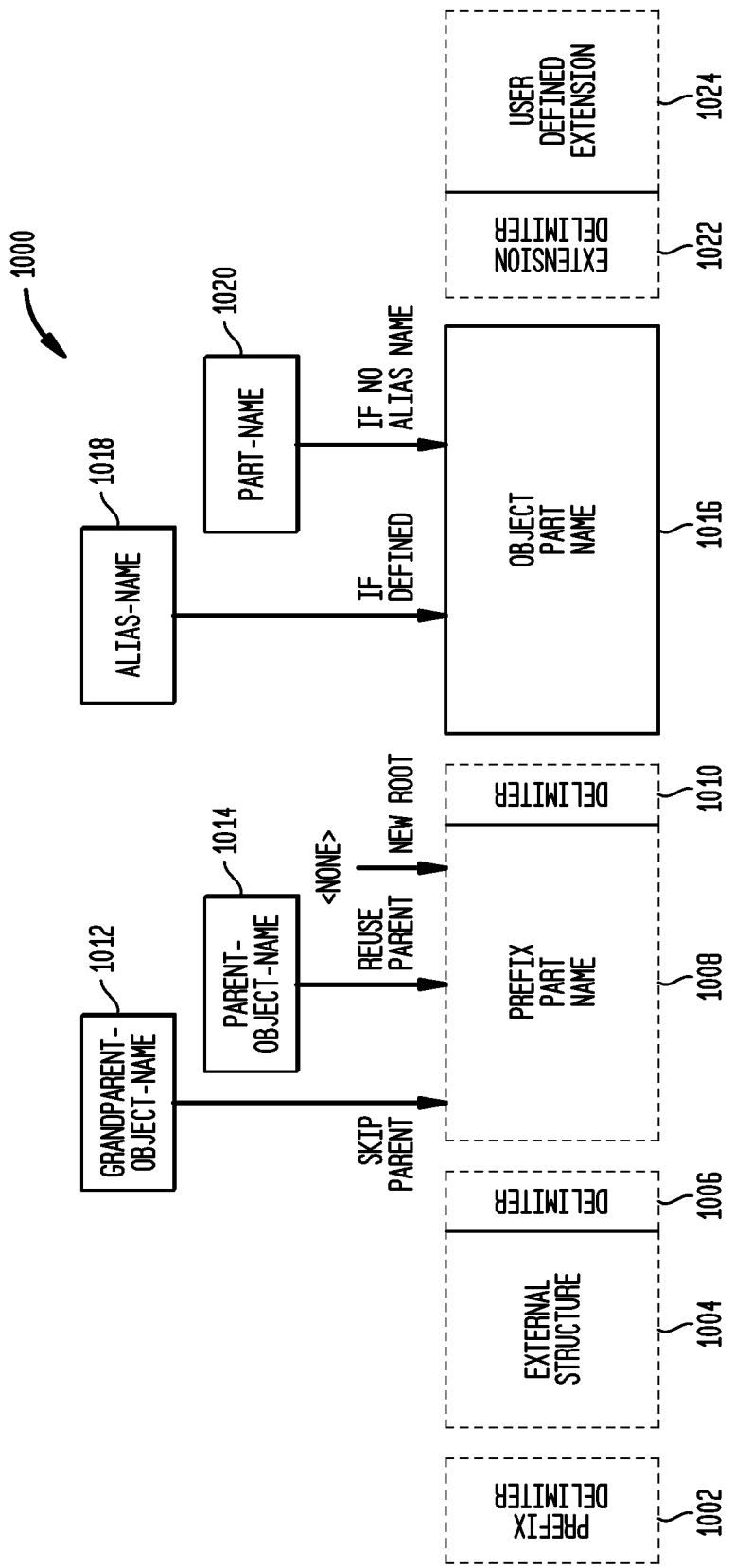
FIG. 10 illustrates the partitioning of the object name and possible optional and mandatory inputs for constructing an object name.

FIG. 10 illustrates the partitioning of the object name and possible optional and mandatory inputs for constructing an object name. Naming construct 1000 is a rendered graphical representation of the exemplary construct expressed as: Object-Name=[Delimiter] [(External-Structure|Prefix-Part-Name)] Object-Part-Name [User-Defined-Extension]. Exemplary naming construct 1000 is expressed in Extended Backus-Naur Form (EBNF) such that brackets ([ ]) illustrate that the item is optional, and curly parenthesis ({ }) indicate one or more (such as in the case of {character} expressing a string). As illustrated in FIG. 10, dotted boxes illustrate that the item is optional, whereas as solid-line boxes indicate that the item is not optional. Accordingly, Prefix Delimiter 1002, External Structure 1004, Delimiter 1006, Prefix Part Name 1008, Delimiter 1010, Extension Delimiter 1022 and User Defined Extension 1024 are optional, whereas Object Part Name 1016 is not.

Prefix Part Name 1008 may comprise the Grandparent-Object-Name 1012 (e.g., the object name of the object's parent's parent thus skipping the name of the object's immediate parent); the Parent-Object-Name 1014 (thus reusing the name of the parent) or no part name at all.

Object Part Name 1016 may comprise the Alias-Name 1018 (e.g. a user-defined name representing the part) or the Part-Name 1020 if there is no alias name defined.

To the extent there is more than one object having the same Object Part Name 1016, an optional Extension Delimiter 1022 and User Defined Extension 1024 may be added (e.g. to represent that the object is one of two or more).

Furthermore, as illustrated herein, exemplary naming construct 1000 is defined such that:

Delimiter=character (*dedicated character, not used in names*);

External-Structure={character} [Delimiter {character}] Delimiter;

Prefix-Part-Name=(Parent-Object-Name|Grandparent-Object-Name) Delimiter;

Parent-Object-Name=Object-Name (*parent object is defined by owns-relation*);

Object-Part-Name=Part-Name|Alias-Name;

User-Define-Extension=Delimiter {character};

The character utilized as a delimiter is preferably one that is not utilized in any portion of the name. For example, as illustrated in FIG. 8 the delimiter is a period. Other characters are contemplated.

Figure 11:
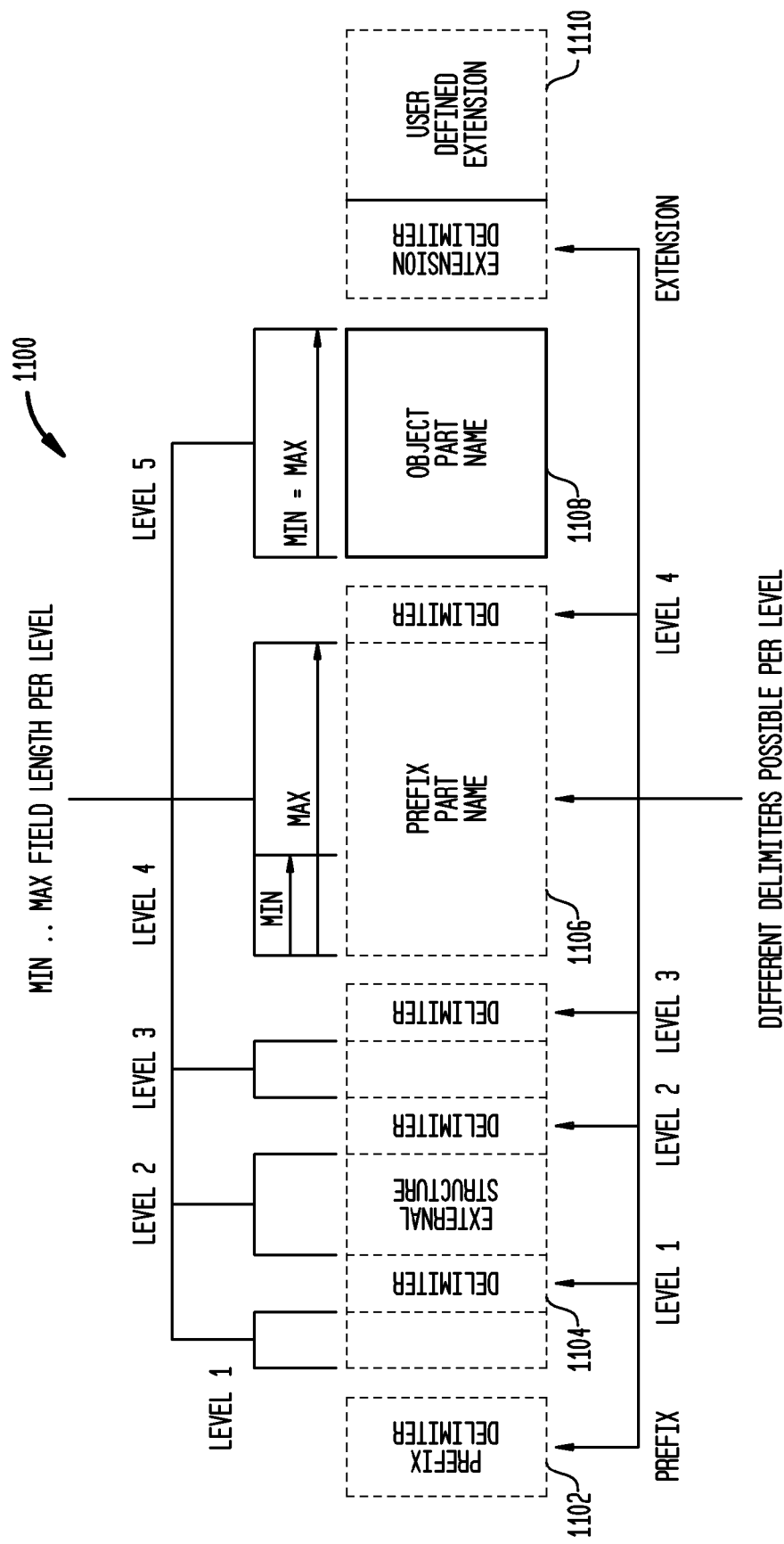
FIG. 11 illustrates the part field delimiters and part field length rules for constructing an object name.

FIG. 11 illustrates the part field delimiters and part field length rules for constructing an object name. Level 1 is the highest level of the object hierarchy, typically representing a building level, but other representations are contemplated. Levels 2 through N are intermediate levels, and level N+1 is the bottom most child object. For example, Level 1 may represent a building, level 2 may represent a floor in the building, level 3 may represent a room (or grid or segment), level 4 may represent an application function or device, and level 5 may represent an analog input or output object (or other types, including but not limited to binary input or output, multistate inputs and outputs, value objects, and any combination thereof from a respective field device or subcontroller of a respective field device).

As illustrated in FIG. 11, each level may include a delimiter that is the same or different from any other delimiter. Thus, the delimiters used optional External Structure construct 1104 may be the same or different from the delimiter used in optional Prefix Delimiter 1102, which may be the same or different from the delimiter used in optional Prefix Part Name construct 1106, which may be the same or different from the extension delimiter used in optional User Defined Extension 1110 construct. Accordingly, a delimiter separating optional Prefix Part Name construct 1106 from required Object Part Name 1108 may be a period, whereas another delimiter utilized elsewhere may be a $.

To the extent there is more than one object having the same Object Part Name 1108 and connected to the same parent object (via an owns relation), an optional User Defined Construct 1110 may be added (e.g. to represent that the object is one of two or more).

Naming construct 1100 also includes variable length fields which may be defined by the operator. For example, as illustrated in FIG. 11, Object Part Name 1108 is illustrated as having a set defined length because the maximum length is equal to the minimum length. However, Prefix Part Name must have a certain minimum length but cannot have a length longer than the maximum length.

Figure 12:
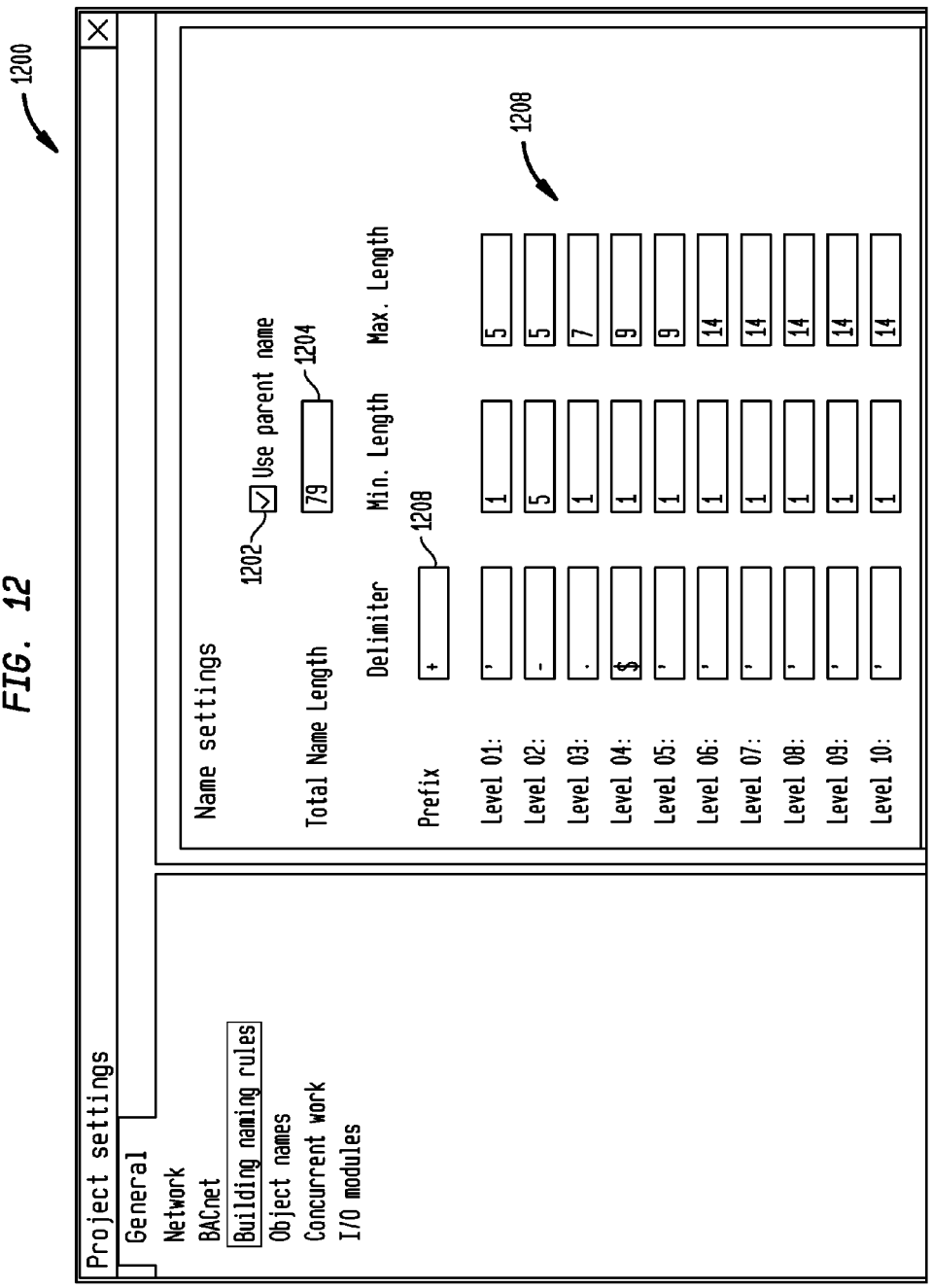
FIG. 12 illustrates a graphical user interface system for defining naming rules.

For example, FIG. 12 illustrates a graphical user interface system 1200 of an engineering tool that may be used to configure and commission a building automation model for implementation in building automation devices as illustrated. The graphical user interface system or engineering tool 1200 is operatively configured to define and implement naming rules, such as the naming constructs illustrated in FIGS. 10-11. Referring to FIG. 12, graphical user interface 1200 includes Use Parent Name checkbox 1202 wherein a user can check the box if the user desires the object name to include the name of the parent, thus forming a naming hierarchy. User also may input the total name length 1204 of the naming construct. User may input what prefix delimiter 1208 is to be used in naming objects. User may also input a series of delimiters, minimum length, and maximum length for each level 1208 of the naming construct. After setting the naming construct criteria, the system automatically applies the naming criteria to a hierarchy of objects, such as that illustrated in FIG. 13.

Figure 13:
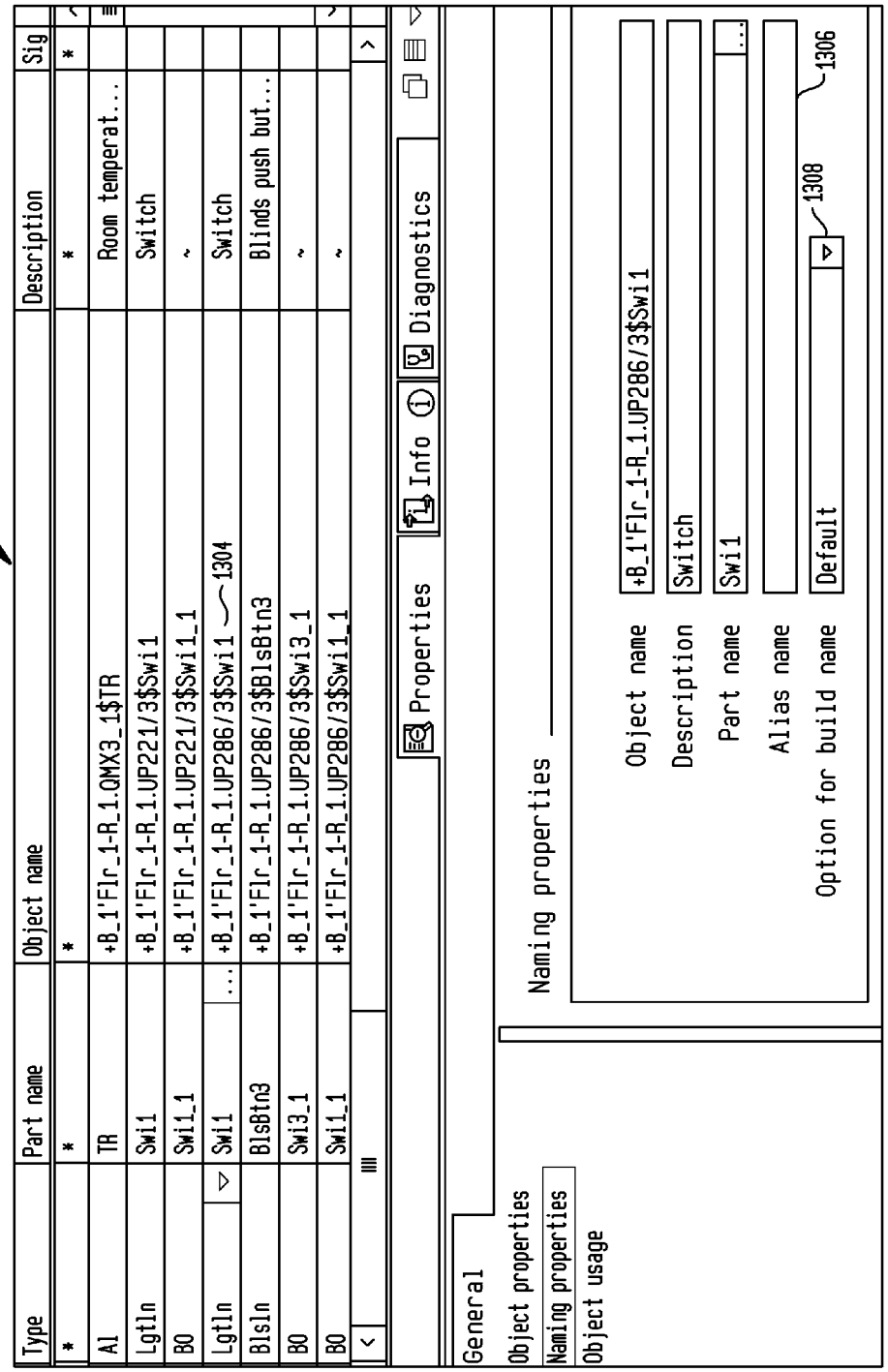
FIG. 13 illustrates a graphical user interface system having naming rules applied.

FIG. 13 illustrating graphical user interface system 1300 having naming rules applied. Graphical user interface system 1300 includes a table 1302 of objects which includes in columns from left to right, the object type, part name, constructed object name using the method and system illustrated in FIGS. 10-12, and a user-defined description; other column configurations and types are contemplated.

As can be seen in the fourth row of table 1302, using the criteria defined in FIG. 12, the system generated a naming of switch 1 residing in building 1, floor 1, room 1, zone UP286, having the part name of 3$Swi1. If the user desired to instead use the alias name as illustrated in FIG. 10, the user may type in the alias name in naming properties box 1306 illustrated in FIG. 13. If the user wants to have different naming rules for a single object, other than the default rules from the project settings (as illustrated in FIG. 12), the user may select another option 1308, such as reusing the parent, skipping the parent, or adding a new root. Other naming constructs and graphical user interfaces are contemplated.

The methods, processes, and systems illustrated herein and equivalents thereto provide numerous benefits including but not limited to, the support of a uniform naming and addressing system which globally harmonizes and standardizes a uniform naming and addressing concept for all building automation objects which reduces errors and improves efficiency in modeling a building automation system. Numerous other benefits exist.

Those of skill in the art will appreciate that embodiments not expressly illustrated herein may be practiced within the scope of the present discovery, including that features described herein for different embodiments may be combined with each other and/or with currently-known or future-developed technologies while remaining within the scope of the claims presented here. It is therefore intended that the foregoing detailed description be regarded as illustrative rather than limiting. It is understood that the following claims, including all equivalents, are intended to define the spirit and scope of this discovery. Furthermore, the advantages described above are not necessarily the only advantages of the discovery, and it is not necessarily expected that all of the described advantages will be achieved with every embodiment of the discovery.

What is claimed is:

1. A method for naming a plurality of building automation objects of a building automation model, the method comprising:
   providing a building automation device;
   providing a building automation model comprising a parent view node object representing the building automation device and a child view node object logically linked to a field device, the field device comprising a sensor or an actuator, wherein the child view node object is logically linked to the parent view node object forming a hierarchical structure;
   assigning an object-name to the parent view node object representing a name of the building automation device; and
   assigning an object-name to the child view node object comprising the object-name of the parent view node object and a name representing the field device,
   wherein the hierarchal structure is formed by a logical tree of at least parent-child-grandchild nodes such that each child is logically linked to a corresponding parent and each grandchild is logically linked to a corresponding child, forming a logically linked list.

2. The method of claim 1, wherein the assigning the object-name to the parent view node and assigning the object-name to the child view node comprises forming each of the object-name as a construct defined as [Delimiter] [(External-Structure|Prefix-Part-Name)] Object-Part-Name [User-Defined-Extension].

3. The method of claim 2, wherein the Object-Part-Name is constructed from an alias-name or a part-name.

4. The method of claim 2, wherein the Prefix-Part-Name is constructed from a grandparent name or parent-object-name.

5. The method of claim 1, wherein the child view node object comprises a plurality of child view node objects,
   wherein each of the plurality of child view node objects is logically linked to a field device and the parent view node object.

6. The method of claim 5, further comprising iterating through the parent view node object and each of the plurality of child view node objects and reading data stored within each of the plurality of child view node objects.

7. The method of claim 5, further comprising iterating through the parent view node object and each of the plurality of child view node objects and writing data stored within each of the plurality of child view node objects.

8. The method of claim 5, further comprising assigning an object-name to each of the plurality of child view node objects each as a construct defined as [Delimiter] [(External-Structure|Prefix-Part-Name)] Object-Part-Name [User-Defined-Extension].

9. The method of claim 1, wherein the building automation device is an air handling unit building automation device.

10. The method of claim 1, further comprising identifying each child and each grandchild of the logically linked list, the identifying comprising iterating from the parent view node object.

11. A system for representing a hierarchal structure representing one or more building automation devices and one or more field devices, the system comprising:
    a parent view node object representing a building automation device and logically linked to a plurality of child view node objects,
    wherein each of the plurality of child view node objects is logically linked to a field device, the field device comprising a sensor or an actuator,
    wherein the parent view node object comprises an object-name,
    wherein a child view node object of the plurality of child view node objects comprises an object-name representing the field device to which the child view node object is logically linked and including the object-name of the parent view node object, and
    wherein the hierarchal system is formed by a logical tree of at least parent-child-grandchild nodes such that each child is logically linked to a corresponding parent and each grandchild is logically linked to a corresponding child, forming a logically linked list.

12. The system of claim 11, wherein the system further comprises a graphical user interface for defining a naming construct for the parent view node object and the plurality of child view node objects.

13. The system of claim 12, wherein the naming construct is defined as object-name=[Delimiter] [(External-Structure|Prefix-Part-Name)] Object-Part-Name [User-Defined-Extension].

14. The system of claim 13, wherein the Object-Part-Name is constructed from an alias-name or a part-name.

15. The system of claim 13, wherein the Prefix-Part-Name is constructed from a grandparent name or parent-object-name.

16. The system of claim 11, wherein each child and each grandchild of the logically linked list is identified, the identification comprising iteration from the parent view node object.

17. In a non-transitory computer readable storage medium having stored therein data representing instructions executable by a programmed processor for iterating through a hierarchal structure representing one or more building automation devices and one or more field devices, the storage medium comprising instructions for:
    accessing a parent view node object;
    accessing a child view node object;
    logically linking the child view node object to the parent view node object;
    assigning an object-name to the parent view node object; and
    assigning an object-name to the child view node object representing a field device logically linked to the child view node object, the field device comprising a sensor or an actuator,
    wherein the hierarchal system is formed by a logical tree of at least parent-child-grandchild nodes such that each child is logically linked to a corresponding parent and each grandchild is logically linked to a corresponding child, forming a logically linked list.

18. The non-transitory computer readable storage medium of claim 17, wherein the assigning an object-name to the parent view node object and the assigning an object-name to the child view node object further comprise an object-name construct comprising [Delimiter] [(External-Structure|Prefix-Part-Name)] Object-Part-Name [User-Defined-Extension].

19. The non-transitory computer readable storage medium of claim 17, further comprising iterating through the parent view node object and the child view node object and reading data stored therein.

20. The non-transitory computer readable storage medium of claim 17, wherein the storage medium further comprises instructions for rendering a graphical user interface for defining a naming construct.

21. The non-transitory computer readable storage medium of claim 17, wherein the child view node object comprises a plurality of child view node objects,
    wherein each of the plurality of child view node objects is logically linked to the parent view node object and a field device, and
    wherein each of the plurality of child view node objects is assigned an object-name comprising the object-name of the parent view node object and a name representing the field device to which each of the plurality of child view node objects is logically linked.

* * * * *